United States Patent [19]

Raynor et al.

[11] 3,882,052

[45] May 6, 1975

[54] ON-SITE GENERATION OF NON-FROTH POLYURETHANE FOAM

[75] Inventors: Robert J. Raynor, North Branford; Wade T. Petroskey, West Haven, both of Conn.

[73] Assignee: Olin Corporation, New Haven, Conn.

[22] Filed: Dec. 17, 1973

[21] Appl. No.: 425,597

[52] U.S. Cl... 260/2.5 BD; 260/2.5 AF; 260/2.5 BC
[51] Int. Cl............................................. C08g 22/46
[58] Field of Search..... 260/2.5 BD, 2.5 BC, 2.5 AF

[56] References Cited
UNITED STATES PATENTS

| | | | |
|---|---|---|---|
| 3,541,023 | 11/1970 | Cole | 252/359 E |
| 3,769,232 | 10/1973 | Houldridge | 260/2.5 BC |

OTHER PUBLICATIONS

Du Pont Foam Bulletin, "Frothing Process for Urethane Foams," Ely196; June 22, 1960, pp. 1 to 8.

"Autofroth I," Technical Bulletin published by the Polytron Company, 3 pages.

Saunders et al., Polyurethanes: Chemistry and Technology, I, Chemistry; Interscience; N.Y., 1962; pp. 237–241.

ICI Technical Information Bulletin Urethane PC/U.33, "Control of Cell Size in Flexible Polyurethane Foams by Air Injection;" March 13, 1962, 8 pages.

*Primary Examiner*—Donald E. Czaja
*Assistant Examiner*—C. Warren Ivy
*Attorney, Agent, or Firm*—F. A. Iskander; T. P. O'Day

[57] ABSTRACT

Non-froth polyurethane foam is generated from a portable foaming apparatus using a foam forming formulation which includes a select inert gas as a nucleating agent.

18 Claims, No Drawings

ON-SITE GENERATION OF NON-FROTH POLYURETHANE FOAM

This invention relates to an improvement in the preparation of polyurethane foam. More particularly, the invention relates to an improved process for the on-site generation of non-froth polyurethane foam.

Various portable systems have been developed in recent years for the on-site generation of polyurethane foam such as used, for instance, in making foam-core structural panels and poured-in-place foam building insulation. See for example the portable foaming apparatus disclosed in U.S. Pat. Nos. 3,541,023 and 2,769,232.

Typically, a portable apparatus for the on-site generation of polyurethane foam comprises two or more vessels, for supplying the foam forming reactants, and a static mixer for blending these reactants together before they are dispensed onto a surface where foaming takes place. As distinguished from the mechanical mixers used in stationary or non-portable foaming apparatus, the static mixer by definition has no moving parts. Generally it is made up a hollow tube or chamber having a plurality of internal elements designed to bring about blending of the foam forming ingredients as these flow through the mixer. An illustrative such mixer is disclosed in U.S. Pat. No. 3,286,992.

It is generally known that thorough mixing and blending of the foam forming ingredients, to the degree necessary for generating a uniform and acceptable foam which is free of weak spots, cannot ordinarily be achieved by the single expedient of using a static mixer. This is due in part to the relatively high viscosity of the foam forming reactants. Conventionally, therefore, resort is had to the added expedient of incorporating in the foam forming reaction mixture an auxiliary fluorocarbon blowing agent such as Freon 12. This material, when injected under pressure into the foam forming mixture, serves to augment the function of the static mixer in bringing about intimate and thorough blending of the foam forming ingredients.

By virtue of the inclusion of this auxiliary blowing agent in the foam forming mixture, the blended components of the system, on being expelled from the foaming apparatus, characteristically have a limited-flow consistency similar to that of aerosol shaving cream. This is attributed to the fact that the auxiliary blowing agent causes partial pre-expansion or "frothing" of the mixture by the time this is expelled from the foaming apparatus. Thus the foam has come to be referred to in this particular art as a "frothed foam."

The phenomenon of foam frothing, while it may be desirable in certain applications, has at least two disadvantages. One is that frothed foam is generally not well suited for the dispensation of repeated small foam shots such as used, for example, in making foam-insulated food and beverage containers. Another disadvantage is that because of its relatively high viscosity, the frothed mixture has limited flow characteristics. As such it cannot be satisfactorily used in molding intricate foam articles such as wood-simulated picture frames, table lamp bases, plaques and the like. Thus a need exists in this art for a method which enables generating non-froth polyurethane foam by means of a portable foaming apparatus.

Now, according to the invention, an improvement has been found which accomplishes this objective. The improvement resides in utilizing, as a blending or nucleating agent in the foam forming reaction mixture, an inert gas which has an atmospheric boiling point below about $-80°C$. The inclusion of such a gas in the foam forming reaction mixture has been found to enable the dispensation, from a portable foaming apparatus, of a non-froth, yet thoroughly blended, foam forming reaction mixture. Such a gas is referred to hereinafter as a "nucleating gas." It is to be understood that the term "portable foaming apparatus" as used in the specification and claims herein refers to an apparatus which embodies a static, as opposed to a mechanical, mixer.

Except for the use of the nucleating gas, the process of the invention for the on-site generation of polyurethane foam is carried out according to established prior art methods as described in more detail hereinbelow.

Any polyurethane foam forming composition which is suitable for processing and dispensation via a portable foaming apparatus may be employed in preparing polyurethane foam according to the invention. This usually comprises a polyol reactant, an organic isocyanate reactant, a foaming agent, a reaction catalyst and, preferably, a surfactant.

The polyol reactant can be any compound, or a mixture thereof, having from 2 to 8 active hydrogens. This includes the polyether polyols and the polyester polyols. The polyether polyols however, are preferred, especially those having an average hydroxyl number of about 300–700 which are used to make rigid polyurethane foam. Illustrative such polyether polyols include the oxyalkylated polyols. These can be prepared by methods well known in the art wherein a polyhydroxy initiator is condensed, in the presence of an acidic or basic catalyst, with an alkylene oxide, or a mixture of alkylene oxides using either random or step-wise oxyalkylation techniques. The alkylene oxides are exemplified by ethylene oxide, propylene oxide, butylene oxide and the ephihalohydrins such as 4,4,4-trichloro-1,2-epoxybutane. The preferred alkylene oxides are propylene oxide and 4,4,4-trichloro-1,2-epoxybutane.

Polyhydroxy initiators suitable for preparing the polyether polyols include, for example, ethylene glycol, propylene glycol, glycerol, pentaerythritol, sorbitol, methyl glucoside, sucrose, dextrose and various mixtures comprising one or more of these initiators such as a mixture of sucrose or dextrose with water and/or an aliphatic polyhydric alcohol, e.g., ethylene glycol. If desired a portion or all of the polyhydroxy initiator may be replaced with another compound having at least two hydrogens such as an aliphatic, aromatic, or aliphatic-aromatic amine.

Particularly preferred polyether polyols for use in practicing the process of the invention are those oxyalkylated polyols or mixtures thereof having an average of about 4–8 active hydrogens, such as those which comprise the product of oxyalkylating pentaerythritol, sucrose, dextrose, or methyl glucoside. The most preferred oxyalkylated polyols are those derived from a mixture of high functionability, i.e., 4–8 active hydrogens, and low-functionability, i.e., 2–3 active hydrogens, initiators. Illustrative of these are the mixtures of sucrose, dextrose, or methyl glucoside with ethylene glycol, propylene glycol, glycerol, or trimethylolpropane.

Any organic isocyanate, or mixture thereof, which is capable of reacting with a polyol to form a urethane may be employed in preparing the polyurethane foams of the invention. Illustrative are toluene diisocyanate, such as the 4:1 and the 65:35 weight mixtures of 2,4- and 2,6-isomers, propylene diisocyanate, 3,3'-bitoluene-4,4'-diisocyanate, hexamethylene diisocyanate, methylene-bis(phenylisocyanate) -bis(phenylisocyanate) and the polymeric isocyanates such as polyphenylene polymethylene isocyanate. The preferred isocyanates are toluene diisocyanate, methylene-bis(phenylisocyanate), polyphenylene polymethylene isocyanate and mixtures thereof, inasmuch as those are perticularly suitable for processing through a portable foaming apparatus.

The amount of organic isocyanate which is used should be sufficient to provide at least about 0.7, and preferably about 0.9–1.25, NCO group per every hydroxy group which is present in the foam forming reaction mixture.

The polyurethane foam forming reaction mixture comprises a foaming agent, and this may be any of those known to be useful for this purpose or mixtures thereof. Illustrative are water and the organic foaming agents such as the halogenated alkanes, the latter being particularly preferred. Exemplificative of the latter are the fluorochloro-alkanes such as trichlorofluoromethane, trichlorotrifluoroethane, mixtures thereof and the like. Any suitable proportion of the foaming agent, or mixture of foaming agents, may be employed provided that this does not result in any substantial frothing. Thus water is usually used in any suitable proportion from about 0.1 to about 8 parts per every 100 parts by weight of the polyol; and a suitable proportion of the organic foaming agent may range from about 1 to about 30, and preferably about 3–15, parts per every 100 parts by weight of the polyol.

The foams of the invention are prepared in the presence of a reaction catalyst. This may be any one of those known to be useful for this prupose, or mixtures thereof, including the tertiary amines and the metallic salts, particularly stannous salts. Typical tertiary amines include, for example, N-methyl morpholine, triethylene diamine and triethylamine. Typical metallic salts include, for example, dibutyltin dilaurate, stannous octoate and the like. The preferred catalysts are those comprising a tertiary amine such as triethylene diamine which may be purchased, as a ready-to-use composition, under the trademark Dabco 33LV. Any suitable catalytic proportion of the catalyst may be employed, such as from about 0.05 to about 3.0, and preferably about 0.075–2.0, parts per every 100 parts of the polyol reactant.

It is preferred in preparing the polyurethane foams of the invention to include in the foam forming reaction mixture a small proportion of a conventional surfactant in order to improve the cell structure of the resulting foam. Typical such surfactants are the silicones and the siloxaneoxyalkylene block copolymers. U.S. Pat. No. 2,834,748 and T. H. Ferrigno, Rigid Plastic Foams (New York:Reinhold Publishing Corp., 1963), pp. 38–42, disclose various surfactants which are useful for this purpose. Generally up to 2 parts by weight of the surfactant are employed per every 100 parts of the polyol reactant.

The generation of non-froth polyurethane foam by means of a portable foaming apparatus is achieved, according to the invention, by incorporating in the foam forming reaction mixture a nucleating gas having an atmospheric boiling point below about −80°C, preferably below about −130°C, and more preferably from about −170 to about −300°C. Any such gas or gas mixture may be employed provided this is inert, i.e., does not interfere with the polyurethane foam forming reaction. Illustrative are nitrogen, air and helium. Nitrogen is the preferred nucleating gas for several reasons. Thus in addition to its low cost and common availability, it has been found to be especially suited for use as a polyurethane foam nucleating agent. Furthermore, nitrogen is the gas conventionally used to pressurize the foaming system and drive the reactants from their respective storage tanks through the static mixer. Thus using nitrogen obviates the need for providing an additional source or container for supplying the nucleating gas.

The nucleating gas may be used in any suitable proportion that is effective in bringing about thorough blending of the foam forming ingredients such as to produce an acceptable foam which is substantially uniform and free of weak spots. Thus this proportion can be varied over a wide range, limited only by practical considerations such as the capacity of the foam forming mixture to dissolve or hold the gas within it under the desired operational gas pressure and the nature of the particular foaming system that is used. Nevertheless, ordinarily a minimum of about 0.003% by weight of the gas, based on the total weight of the foam forming ingredients, is necessary to achieve the requisite nucleating effect. In actual practice a proportion of the gas in excess of 0.005 percent, such as from about 0.006 to about 0.08 percent by weight is used, although of course higher as well as lower concentration may suitably be employed.

Any suitable portable foaming apparatus may be utilized in practicing the method of the invention. Apparatus of the general type disclosed in U.S. Pat. No. 3,769,232, issued Oct. 30, 1973 and U.S. Pat. No. 3,541,023, issued Nov. 17, 1970, are illustrative. The disclosures of both of these patents are incorporated by reference herein.

Typically, the portable foaming apparatus is comprised of at least two reactants supply tanks, a static mixer having inlets in communication with the supply tanks and an outlet for expelling the mixed reactants, means for imposing gas pressure to drive the reactants from the supply tanks, through and out of the static mixer, and flow control units for delivering the desired ratio of reactants, from their respective tanks, to the static mixer.

One of the supply tanks contains the organic isocyanate reactant or an organic isocyanate-terminated prepolymer. If desired, this tank may also contain an additive amount of a non-reactive fire-resisting material which may be used to impart flame retardant properties to the resulting foam.

The other polyurethane foam forming reactants may be supplied from one or more additional supply tanks. Usually, a single second tank is used to supply all these other reactants, i.e., polyol, foaming agent, catalyst, and surfactant, if such is used.

It is generally preferred, for proper functioning of the portable foaming apparatus, that the viscosity of the contents of each of the supply tanks be no greater than about 1500 cps at 25°C and preferably no more than about 800 cps such as about 100–700 cps. This of course means that the materials in each tank may have to be properly selected or formulated, as the case may be, in order to meet this viscosity requirement. For example, it is common practice to adjust the viscosity of highly viscous polyether polyols by blending with them certain selected proportions of a low viscosity glycol or triol.

The portable foaming apparatus comprises a static mixer which, as defined above, is one containing no moving parts. Any such mixer which serves, in the presence of the nucleating agent, to adequately blend the reactants may be used. Illustrative such mixer is the one disclosed in U.S. Pat. No. 3,286,992.

Any means for imposing pressure to drive the reactants from the supply tanks, through and out of the static mixer may be used. Typically a pressurized gas tank, such as a nitrogen tank, is used, having valved outlets communicating, via suitable conduits, with the inlets to the supply tanks.

In utilizing the concept of the invention for effecting the nucleation of the foam forming ingredients, it is critical that the nucleating gas, or at least a portion thereof, be blended, dissolved, or adsorbed into the foam forming mixture. This critical requirement is to be distinguished from conventional prior art techniques wherein a gas, for example nitrogen, is used only as a propellant; and, as such, it is not blended with the foamable mixture and therefore exerts no substantial nucleating effect. This prior art technique, as noted above, necessitates the use of an auxiliary foaming agent to achieve adequate mixing which in turn results in the generation of frothed foam, a result that this invention avoids.

Any suitable procedure may be used to bring about the blending of the nucleating gas with the foam forming ingredients. For example, each supply tank, being pressurized with the nucleating gas, may be subjected to agitation in order to bring about the blending of a portion of the gas into the liquid constituents of the tanks. Where the supply tanks are cylindrical, as is usually the case, the requisite degree of agitation may be achieved for example by horizontally rolling or rotating these tanks on drum rollers after the tanks have been pressurized with the nucleating gas. An alternate procedure is to supply the nucleating gas, as a separate stream, to the static mixer where blending with the foam forming ingredients takes place. Using this procedure, the nucleating gas, delivered to the static mixer from a separate, pressurized supply tank, must be under a sufficient pressure, i.e., usually above about 60 psig., to overcome the back-up pressure that it will encounter in entering the static mixer.

By utilizing a nucleating agent according to the invention, thorough blending of the foam forming ingredients is achieved, by means of a static mixer, to the degree necessary for producing a fully reacted polyurethane foam product which is substantially uniform and free of weak spots. This result obtains in the substantial absence of any frothing. That it is to say, the blended foaming mixture, upon expulsion from the static mixer, exhibits no substantial pre-expansion and has a very fluid consistency. The foaming reaction commences practically as soon as the mixture is deposited from the static mixer onto a surface or into a mold; and it is usually complete within a few minutes. The foam may then be allowed to cure at room temperature, or, if desired, moderate heat may be used to accelerate the curing process.

Polyurethane foams prepared by the process of the invention are of utility in a variety of applications in which the foam is generated on-site from a portable foaming apparatus. This includes the production of foam-core structural panels and partitions, building and vehicular insulation, small floats, and a variety of molded objects for use in home furnishing. Furthermore, by virtue of their non-froth characteristic, the foams of the invention are of particular utility in those molding applications which require minimum surface imperfections and uniform, reliable conformity to a certain shape and size. Such applications include for example the production of foam-insulated small food containers and intricate, wood-simulated furniture parts and decorative articles.

The following examples are provided to illustrate the invention. The foaming apparatus used in these examples was identical to the apparatus disclosed in U.S. Pat. No. 3,769,232 except that it did not include the valved timing assembly embodied in the apparatus of that patent. Thus the apparatus comprised (a) a first supply tank for supplying the isocyanate reactant, (b) a second supply tank for supplying the other foam forming ingredients, (c) a nitrogen pressure tank having a valved outlet in communication, via a distributing valve, with the inlets to the two supply tanks, (d) a static mixer having one outlet and two inlets communicating with the supply tanks outlets, and (e) and adjustable flow control units interposed in the conduits linking the supply tank with the static mixer.

EXAMPLE 1

The portable foaming apparatus referred to above was employed to prepare a non-froth, rigid, molded polyurethane foam using the procedure and ingredients described below.

The foam forming ingredients were supplied from two cylindrical metal tanks. One supply tank contained the isocyanate reactant, namely, polymethylene polyphenylene isocyanate. This material, purchased commercially under the trademark "PAPI-135", had a viscosity, at 25°C, of 200 cps. The other supply tank, the total content of which had a viscosity of 575 cps at 25°C, contained the following ingredients in the indicated relative proportions:

| Ingredients | Parts By Weight |
| --- | --- |
| methyl glucoside-based polyol[1] | 55.0 |
| oxypropylated glycerol, 280 OH No. | 30.0 |
| dipropylene glycol | 11.0 |
| propylene glycol | 4.0 |
| triethylene diamine catalyst composition[2] | 1.6 |
| trichloromonofluoromethane blowing agent | 9.0 |
| silicone surfactant[3] | 1.4 |

[1] This is the product of oxypropylating a mixture of 4 moles methyl glucoside and 1 mole glycerol to an OH number of 375.
[2] This catalyst composition was purchased commercially under the trademark "Dabco 33-LV."
[3] This surfactant was purchased commercially under the trademark "DC-193".

Each of the two supply tanks was pressurized with nitrogen to a pressure of 100 psig., and each was then placed horizontally on a drum roller and rotated continuously for 30 minutes at an approximate rate of 35 revolutions per minute. After the rotation was stopped, the inlets to the two supply tanks were connected to the nitrogen pressure tank and and the pressure was increased to 240 psig. The tanks outlets were connected to the static mixer via separate conduits provided with flow control units. With the flow control units adjusted to deliver to the static mixer equal weight proportions from the first and second supply tanks, the foam forming ingredients were expelled, by means of the nitrogen head pressure, from their respective tanks, through the static mixer, and out into a silicone rubber mold. This mold, the interior surface of which had been coated with a conventional releasing agent, consisted of two complimentary halves defining a cavity which had the configuration of a decorative sail boat plaque.

The foam forming mixture exiting from the static mixer had the fluidity of a low-viscosity liquid and a uniform non-frothed consistency. Double the amount of this mixture, which would have been necessary to fill the mold on a free rise basis, was placed in the mold. With the instantaneous commencement of the foaming reaction, the mold was quickly closed and placed in a mold press. Fifteen minutes thereafter, the foam was removed from the mold and allowed to become fully cured at room temperature.

A close examination of the molded, cured foam article revealed no imperfections on the surface or within it. Rather, the foam was uniform throughout, being free of large voids or weak spots. It had a smooth, blemish-free surface which was an exact replica of the mold cavity.

COMPARISON 1

This comparison is provided to demonstrate that without using nitrogen as a nucleating gas according to the invention, adequate mixing of the reactants cannot be accomplished with a static mixer in the absence of an auxiliary blowing agent.

The identical procedure of Example 1 was followed except for elimination of the step wherein the supply tanks were rotated in order to blend the nitrogen gas into the foam forming ingredients.

The mixture coming out of the static mixer compared in fluidity to that of Example 1. However, the resulting, molded foam article, after demolding and curing, had several weak spots. Several pockets of unreacted (liquid) material were also observed within the body of the foam.

COMPARISON 2

This comparison is provided to show the inadequacy, in certain molding applications, of using an auxiliary blowing agent to augment the function of the static mixer.

Again the identical procedure of Example 1 was followed with two exceptions. First the step of rotating the supply tanks was not used. Second, each of the two supply tanks was provided with about 4 percent, based on the total liquid content of each tank, of an auxiliary blowing agent, namely, dichloro-difluoromethane (Freon 12).

The material coming out of the static mixer was a uniform frothed mixture which had very limited flow characteristics and a consistency similar to that of aerosol shaving cream. The molded foam article resulting from this mixture had several surface blisters or imperfections, and it lacked the surface uniformity and exactness of detail which was obtained in Example 1.

What is claimed is:

1. In a process for producing, by means of a portable foaming apparatus having a static mixer, a polyurethane foam from a reaction mixture comprised of a polyol, an organic isocyanate, a foaming agent and a reaction catalyst, the improvement of producing non-froth foam by blending into said mixture a sufficient proportion of an inert gas to bring about nucleation of said mixture, said inert gas having an atmospheric boiling point below about −80°C.

2. The process of claim 1 wherein said gas is selected from the group consisting of nitrogen, helium, and air.

3. The process of claim 2 wherein said foam is a rigid foam.

4. The process of claim 3 wherein said gas is nitrogen.

5. The process of claim 1 wherein said polyol is a polyether polyol having 2 to 8 active hydrogens.

6. The process of claim 5 wherein said foam is a rigid foam, and said polyether polyol is an oxyalkylated polyol or a mixture of oxyalkylated polyols having an average of 4 to 8 active hydrogens and a hydroxyl number ranging from about 300 to about 700.

7. The process of claim 6 wherein said organic isocyanate is selected from the group consisting of toluene diisocyanate, methylene-bis(phenylisocyanate), polyphenylene polymethylene isocyanate, and a mixture thereof.

8. The process of claim 7 wherein said boiling point is below about −130°C.

9. The process of claim 8 wherein said oxyalkylated polyol or mixture thereof comprises the product of oxyalkylating a polyhydroxy initiator selected from the group consisting of pentaerythritol, sucrose, dextrose, and methyl glucoside.

10. The process of claim 9 wherein said gas is selected from the group consisting of nitrogen, helium, and air.

11. The process of claim 10 wherein said mixture has a viscosity, at 25°C, below about 800 cps.

12. The process of claim 11 wherein said gas is nitrogen.

13. The process of claim 12 wherein said foaming agent is trichlorofluoromethane.

14. The process of claim 13 wherein said mixture also comprises a surfactant.

15. The process of claim 14 wherein said organic isocyanate is polyphenylene polymethylene isocyanate.

16. The process of claim 15 wherein said catalyst comprises a tertiary amine.

17. The process of claim 15 wherein said tertiary amine is triethylene diamine.

18. The process of claim 17 wherein said oxyalkylated polyol or mixture thereof comprises oxypropylated methyl glucoside.

* * * * *